Patented Aug. 16, 1938

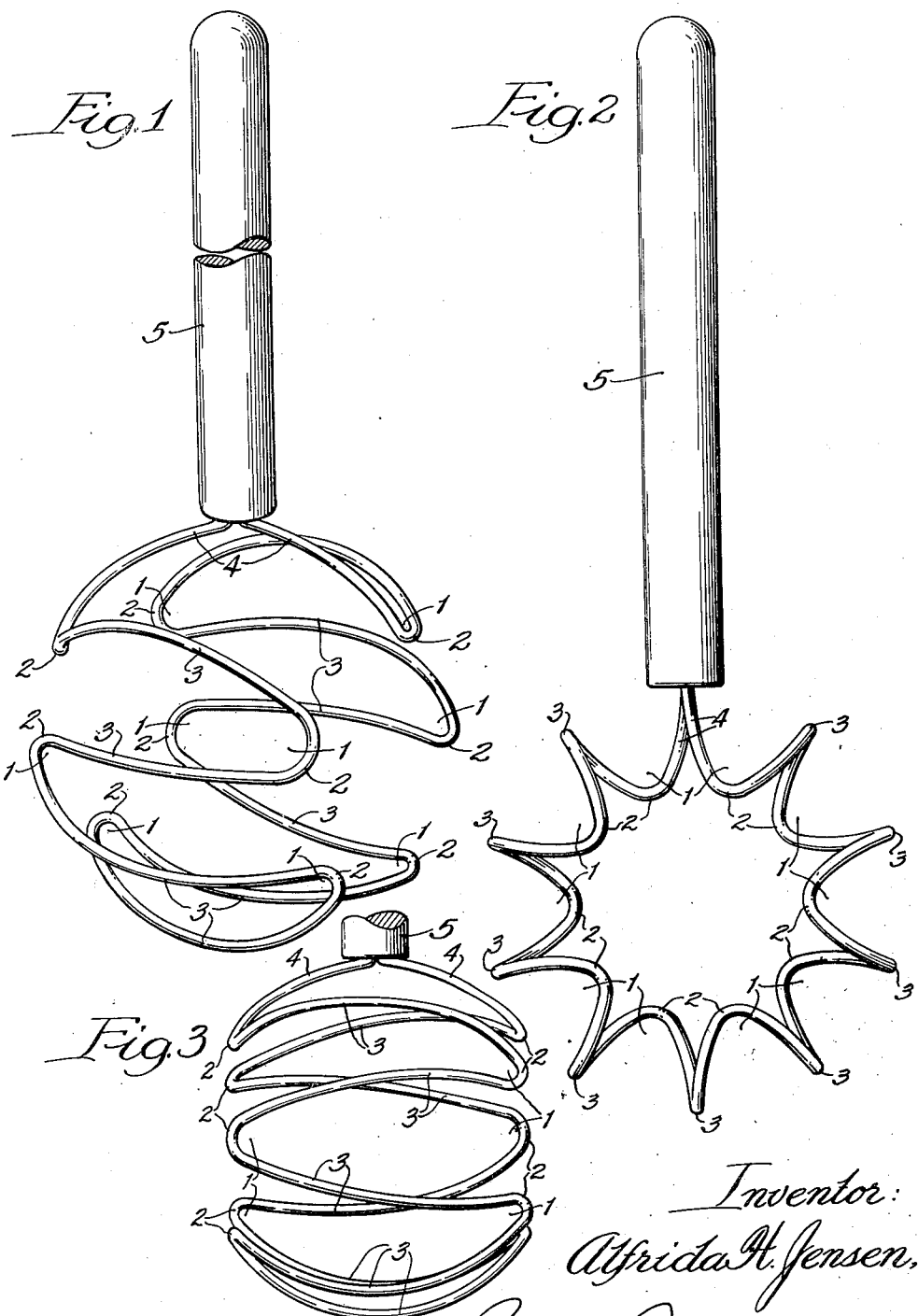

2,126,890

UNITED STATES PATENT OFFICE 2,126,890

FLOUR AND SHORTENING MIXER

Alfrida H. Jensen, Chicago, Ill.

Application November 10, 1937, Serial No. 173,855

1 Claim. (Cl. 259—144)

This invention relates to manual dough mixers and shortening creamers, and particularly to such devices for cutting or folding shortening into flour in the process of making cakes or pastry and the like.

The main objects of this invention are to provide an improved mixer or shortening creamer that will more rapidly and thoroughly cut shortening into flour; to provide such a device having an improved shape or form that materially increases its operating efficiency; to provide such a device from which the material being mixed can be quickly and easily removed; to provide such a device adapted particularly to a rolling or gyratory motion in both horizontal and vertical planes and which will more efficiently coact with the inner surface of a mixing bowl to accomplish the cutting or folding operation; and to provide such a device that is of simple, sturdy construction, having a low manufacturing cost.

A specific embodiment of this invention is shown in the accompanying drawing, in which:

Fig. 1 is a perspective view of the improved mixer or shortening creamer.

Fig. 2 is a view showing a vertical end elevation of the same, and,

Fig. 3 is a similar view showing a side elevation.

In the form shown in the drawing my improved mixer or shortening creamer comprises a substantially rigid bar or metal rod, preferably round in cross-section, bent to form an annular or circular series of zig-zag folds or convolutions and having its terminal ends secured in a handle projecting radially from the circle of the annular series of folds or convolutions. Also, as shown, each bar or strand comprising the several legs of the annular series of convolutions is curved outwardly in a direction transversely of the circle of convolutions, so that as a whole the outermost surfaces of the convolutions, together with the reciprocally bent end portions of each convolution, will lie substantially in the surface of an imaginary ovate body or sphere.

As shown, the wire or metal rod forming the aforesaid convolutions is bent in a zig-zag form to provide a series of successive folds or reciprocal bends 1 which form a series of rounded or blunt points 2, the several strands comprising the legs 3 of the convolutions being substantially parallel. The series of convolutions is then bent in a circular form so that the strands 3 lie transversely of the circle, and parallel with a common central axis, as shown in Figs. 1 and 2, the terminal ends 4 of the wire forming the series of convolutions being brought together at a point on the periphery of the circle midway between the rounded ends 2 of the convolutions.

The terminal portions of the ends 4 are then bent out radially with respect to the circle of the folds or convolutions and secured in any suitable manner in the end of a handle 5.

Each strand or convolution leg 3 is also bent so as to curve outwardly relative to the common central axis and the rounded ends or reciprocal bends 2 of the convolutions, and so that the entire structure will be of a substantially spherical or ovate form in outer contour.

As shown the rounded ends 2 of the several convolutions are spaced from each other and lie in a respective common plane which intersects the body of the device so as to provide opposed lateral or side openings into the interior of the frame or body, the axis of said side or lateral openings being coincident with the aforesaid common central axis about which the series of convolutions progresses and normal to the axis of the handle 5.

Thus the improved mixer or shortening creamer is in the form of a ball-like frame or body mounted on the end of a radially projecting handle and having substantially parallel frame members or strands extending in a direction substantially normal to the axis of the handle, whereby when the handle is held in a vertical position the device will have a plurality of horizontally-disposed cutting members each one of which is positioned to act most efficiently on the material being mixed or folded.

In operation the device is held with the handle in a substantially vertical position and the mixing or cutting of the shortening into the flour or dough is accomplished by means of a combined vertically reciprocating and gyratory motion, the several strands or convolution legs 3 successively engaging and entering the material being mixed and cutting through the same to cause a rapid and thorough blending or mixing of the shortening and the flour or other medium with which the shortening is desired to be mixed.

The main advantages of my improved mixer or shortening creamer reside in the ball or sphere-like shape which not only provides a multiplicity of bars or strands that function as cutting members during almost every conceivable movement that might be imparted to the device, but also more closely follows the contour of the mixing bowl thereby keeping the sides of the same well scraped and free of unmixed portions of the material.

Other advantages are found in the ease with which the device is handled and manipulated during the mixing operation and the rapidity with which the mixing can be accomplished, the spherical shape of the device permitting the device to be moved in substantially any direction or manner without reducing the cutting efficiency of the horizontally-disposed frame members and performing the blending or mixing of shortening of any kind in a shorter time than hand mixers of any other known shape or design.

Although but one specific embodiment of this invention is herein shown and described, it will be understood that details of the construction shown may be altered or omitted without departing from the spirit of this invention as defined by the following claim.

I claim:

A device of the class described comprising a body of hollow spherical shape formed of a stiff wire bent reciprocally to provide an annular progressive series of alternate convolutions having substantially parallel strands extending in the same direction, said strands being curved outwardly to define the periphery of said body and having their opposite ends terminating in spaced reciprocal bends lying in diametrically opposite planes which intersect said body transversely of said strands, and a radially projecting handle disposed medially between the ends of said strands and secured to the terminal ends of said wire.

ALFRIDA H. JENSEN.